United States Patent
Andrew et al.

(10) Patent No.: US 7,045,236 B1
(45) Date of Patent: May 16, 2006

(54) HEAT AND GAS EXCHANGE SYSTEM FOR BATTERY

(75) Inventors: Michael G. Andrew, Menomonee Falls, WI (US); Gary P. Houchin-Miller, Holland, MI (US); William P. Segall, Jr., Grafton, WI (US); Thomas J. Dougherty, Waukesha, WI (US); William J. Wruck, Whitefish Bay, WI (US)

(73) Assignee: Johnson Controls Technology Company, Holland, MI (US)

( * ) Notice: Subject to any disclaimer, the term of this patent is extended or adjusted under 35 U.S.C. 154(b) by 496 days.

(21) Appl. No.: 10/216,060

(22) Filed: Aug. 9, 2002

Related U.S. Application Data
(60) Provisional application No. 60/311,694, filed on Aug. 10, 2001.

(51) Int. Cl.
*H01M 8/12* (2006.01)
*H01M 2/00* (2006.01)

(52) U.S. Cl. .............................. 429/26; 429/34; 429/38; 429/39; 429/24

(58) Field of Classification Search .................. 429/26, 429/34, 38, 39, 24
See application file for complete search history.

(56) References Cited

U.S. PATENT DOCUMENTS

| | | |
|---|---|---|
| 754,969 A | 3/1904 | Burt |
| 1,313,512 A | 8/1919 | Bedell et al. |
| 2,104,773 A | 1/1938 | Saunders |

(Continued)

FOREIGN PATENT DOCUMENTS

| | | |
|---|---|---|
| DE | 2835501 A1 | 2/1980 |
| DE | 4029018 | 3/1992 |
| DE | 4029901 A1 | 3/1992 |
| DE | 4116253 | 6/1992 |
| DE | 10064648 A1 | 7/2001 |
| EP | 0639867 | 2/1995 |
| EP | 0918358 | 5/1999 |
| EP | 0964470 | 12/1999 |
| JP | 20044047363 A | 2/2004 |
| WO | WO 99/18626 A1 | 4/1999 |

OTHER PUBLICATIONS

U.S. Appl. No. 10/272,604 entitled "Rechargeable Battery", Inventor, Markus Hoh filed Oct. 16, 2002, 11 pages.
McKinney et al., Thermal Management of Lead–Acid Batteries for Electric Vehicles, pp. 37–43, Copyright 1983, Society of Automotive Engineers, Inc.

*Primary Examiner*—Patrick Joseph Ryan
*Assistant Examiner*—Angela J. Martin
(74) *Attorney, Agent, or Firm*—Foley & Lardner LLP (57) ABSTRACT

A heat and gas exchange system for a battery is disclosed. The batter includes a plurality of cells and at least one space between the cells. The system includes a base configured to support the battery. The system also includes a plurality of members coupled to the base. Each of the members is configured to extend at least partially within at least one space between the cells of the battery. A heat and gas exchange system for a battery is also disclosed. A module for a battery for a vehicle is also disclosed. The battery includes a plurality of cells and at least one space between the cells. The module includes a base for supporting the battery. The module also includes a plurality of members coupled to the base. The module also includes a control system configured to provide air through the plurality of members from the space between the cells.

20 Claims, 6 Drawing Sheets

U.S. PATENT DOCUMENTS

| | | |
|---|---|---|
| 2,410,952 A | 11/1946 | Lighton |
| 2,980,751 A | 4/1961 | Toce et al. |
| 3,110,633 A | 11/1963 | Bachmann |
| 3,669,744 A | 6/1972 | Tsenter et al. |
| 3,808,445 A | 4/1974 | Bailey |
| 3,834,945 A | 9/1974 | Jensen |
| 3,837,918 A | 9/1974 | Nakabayashi |
| 3,867,199 A | 2/1975 | Dunlop et al. |
| 3,961,605 A | 6/1976 | Kaltner |
| 3,975,210 A | 8/1976 | Warnock |
| 3,977,490 A | 8/1976 | Flaig |
| 4,038,461 A | 7/1977 | Warnock |
| 4,074,018 A | 2/1978 | Haas et al. |
| 4,107,402 A | 8/1978 | Dougherty et al. |
| 4,115,630 A | 9/1978 | Van Ommering et al. |
| 4,117,206 A | 9/1978 | Plust et al. |
| 4,127,703 A | 11/1978 | Holleck |
| 4,215,184 A | 7/1980 | Gutmann et al. |
| 4,327,158 A | 4/1982 | Holleck |
| 4,379,186 A | 4/1983 | Bush et al. |
| 4,413,157 A | 11/1983 | Ames |
| 4,468,440 A | 8/1984 | Evjen |
| 4,567,119 A | 1/1986 | Lim |
| 4,584,249 A | 4/1986 | Smithrick |
| 4,598,786 A | 7/1986 | Kirchweger |
| 4,600,665 A | 7/1986 | Sanders |
| 4,780,379 A | 10/1988 | Puester |
| 4,840,855 A | 6/1989 | Foti et al. |
| 4,854,540 A | 8/1989 | Balek |
| D303,373 S | 9/1989 | Ching, Jr. |
| D304,926 S | 12/1989 | Ching, Jr. |
| D304,927 S | 12/1989 | Ching, Jr. et al. |
| D307,133 S | 4/1990 | Ching, Jr. |
| D307,886 S | 5/1990 | Ching, Jr. |
| 4,976,327 A | 12/1990 | Abujudom, II et al. |
| 5,031,712 A | 7/1991 | Karolek et al. |
| 5,059,496 A | 10/1991 | Sindorf |
| 5,082,075 A | 1/1992 | Karolek et al. |
| 5,141,826 A | 8/1992 | Bohm et al. |
| 5,215,834 A | 6/1993 | Reher et al. |
| 5,283,137 A | 2/1994 | Ching |
| 5,415,956 A | 5/1995 | Ching |
| 5,449,571 A | 9/1995 | Longardner et al. |
| 5,501,918 A | 3/1996 | Gruenstern et al. |
| 5,510,207 A | 4/1996 | Grivel et al. |
| 5,569,552 A | 10/1996 | Rao et al. |
| 5,589,290 A | 12/1996 | Klink et al. |
| 5,753,384 A * | 5/1998 | Kimberg ............... 429/27 |
| 5,856,037 A | 1/1999 | Casale et al. |
| 5,871,862 A | 2/1999 | Olson |
| 5,998,062 A | 12/1999 | Olson |
| 6,007,937 A * | 12/1999 | Ruiz Rodriguez et al. .... 429/94 |
| 6,023,146 A | 2/2000 | Casale et al. |
| 6,025,086 A | 2/2000 | Ching |
| 6,051,336 A | 4/2000 | Dougherty et al. |
| 6,074,774 A | 6/2000 | Semmens et al. |
| 6,087,038 A | 7/2000 | Flament et al. |
| D442,542 S | 5/2001 | Dougherty et al. |
| 6,255,014 B1 | 7/2001 | Dougherty et al. |
| 6,255,015 B1 | 7/2001 | Corrigan et al. |
| D450,035 S | 11/2001 | Ahlgreen |
| 6,335,116 B1 | 1/2002 | Yamane et al. |
| 6,479,185 B1 | 11/2002 | Hilderbrand et al. |
| 6,482,542 B1 | 11/2002 | Takaki et al. |
| 6,512,347 B1 | 1/2003 | Hellmann et al. |
| 6,551,740 B1 | 4/2003 | Melichar |
| 6,596,443 B1 | 7/2003 | Weaver et al. |
| 2001/0026887 A1 | 10/2001 | Minamiura et al. |
| 2001/0033961 A1 | 10/2001 | Gudmundsson et al. |
| 2002/0005271 A1 * | 1/2002 | Weiss et al. ............... 165/61 |
| 2002/0177035 A1 | 11/2002 | Oweis et al. |
| 2003/0027037 A1 | 2/2003 | Moores, Jr. et al. |
| 2003/0054230 A1 | 3/2003 | Al-Hallaj et al. |
| 2003/0082438 A1 | 5/2003 | Kwon |
| 2003/0113617 A1 | 6/2003 | Gaignerot et al. |

* cited by examiner

HEAT AND GAS EXCHANGE SYSTEM FOR BATTERY

CROSS-REFERENCE TO RELATED APPLICATIONS

This application claims priority to U.S. Provisional Patent Application No. 60/311,694 titled "BATTERY HEAT EXCHANGE SYSTEM" filed Aug. 10, 2001, which is hereby incorporated by reference.

FIELD

The present invention relates to a heat and gas exchange system for a battery for use in a vehicle. The present invention more specifically relates to heat exchange system for a battery and a gas exchange system for a battery. The present invention more specifically relates to a container for housing a battery having a venting system.

BACKGROUND

It is generally known to provide for an electric storage battery having a cover and a base with vertical conduits passing through the cover and through the base. Such conduits are typically disposed among adjacent cells of the battery for the circulation of air. However, such known battery has several disadvantages including that relatively hot air can build up in such conduits, resulting in a relatively high temperature of the battery.

It is also generally known to provide for a battery in a container disposed in the passenger compartment of a vehicle. However, such known battery has several disadvantages including that gas from the battery can potentially leak from the container to the passenger compartment of the vehicle.

Accordingly, it would be advantageous to provide a container that provides containment for a battery in the passenger compartment of a vehicle. It would also be advantageous to provide a heat and gas exchange system for a battery that provides for drawing air from the space between the cells of a battery. It would be desirable to provide for a heat and gas exchange system for a battery having one or more of these or other advantageous features.

SUMMARY OF THE INVENTION

The present invention relates to a heat and gas exchange system for a battery for a vehicle. The battery includes a plurality of cells and at least one space between the cells. The system includes a base configured to support the battery. The system also includes a plurality of members coupled to the base. Each of the members is configured to extend at least partially within at least one space between the cells of the battery.

The present invention also relates to a heat and gas exchange system for a battery for a vehicle. The battery includes a plurality of cells and a plurality of spaces between the cells. The system includes a housing having a base configured to support the battery and a cover coupled to the base. The system also includes a first means for venting air from the spaces between the cells of the battery. The system also includes a second means for venting air across an exterior surface of the battery. The first means for venting and the second means for venting both at least partially regulate the temperature within the housing.

The present invention further relates to a module for a battery for a vehicle. The battery includes a plurality of cells and at least one space between the cells. The module includes a base for supporting the battery. The module also includes a plurality of members coupled to the base. The module also includes a control system configured to provide air through the plurality of members from the space between the cells.

DETAILED DESCRIPTION OF PREFERRED AND OTHER EXEMPLARY EMBODIMENTS

Figure 1:
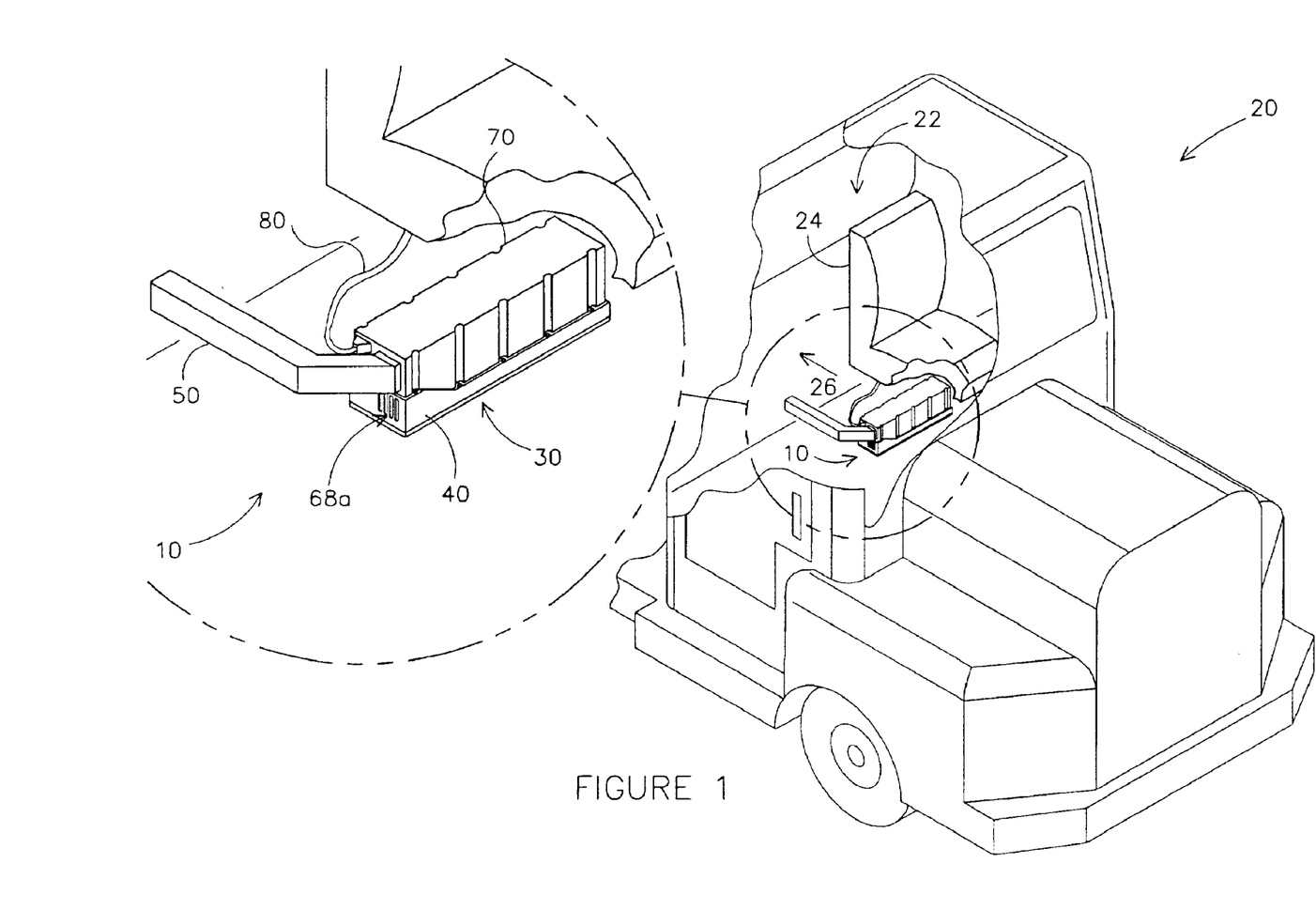
FIG. 1 is a schematic view of a heat and gas exchange system for a battery according to an exemplary embodiment.

A heat and gas exchange system 10 for a battery system 90 is shown according to an exemplary embodiment in FIG. 1. Exchange system 10 includes a heat exchange system 12 for exchanging heat between a battery system 90 and the environment (e.g. a passenger compartment 22 of a vehicle 20). Exchange system 10 also includes a gas exchange system 14 for exchanging gas between the container and the environment (e.g. to an exterior 26 of vehicle 20).

Exchange system 10 includes a module or container 30 for containing battery system 90. Container 30 is located in passenger compartment 22 of vehicle 20 according to a preferred embodiment as shown in FIG. 1. Container 30 is located under a seat 24 of vehicle 20 according to a preferred embodiment as shown in FIG. 1, and may be located in other areas of the vehicle (e.g. trunk, cab, under hood, between seats, in vehicle console, etc.) according to alternative embodiments. Container 30 includes a tray or base 40 for supporting a battery 92a, a battery 92b and a battery 92c of battery system 90. A cap or cover 70 is attached to base 40 by a fastener (shown as a screw 122) to enclose battery system 90 in container 30.

Heat exchange system 12 provides for thermal management of battery system 90 and assists in the regulation of the temperature of battery system 90 in container 30. Thermal management of the battery system may achieve a longer life and optimum performance of the battery system, and may assist in maintaining a generally improved uniform temperature throughout the battery system such that all cells of each battery perform substantially the same.

Heat is exchanged or transferred between battery system 90 and passenger compartment 22 to heat or cool battery system 90 (e.g. by conduction, radiation, convection, etc.). Such transfer of heat is accomplished by heating and cooling the air in container 30 around battery system 90. For example, the battery may be cooled by transfer of heat from the battery to the passenger compartment of the vehicle or by providing cool air from the passenger compartment of the vehicle (or air conditioning system) according to a preferred embodiment. Likewise, the battery system may be warmed by the transfer of warm air from the passenger compartment (or engine, heating system, etc.).

Gas exchange system 14 provides for the venting of gasses from battery system 90 to an exterior 26 of vehicle 20. Gases (e.g. hydrogen) generated by battery system 90 are directly vented to exterior of vehicle 20 though a tube 80, which is attached to container 30 by a fastener 124. Gasses that may be otherwise provided by battery system 90 are vented to the exterior of vehicle through a channel or pipe 50.

Battery system 90 includes a "pack" or combination of batteries 92a, 92b and 92c connected in series (e.g. 24V, 42V, etc.) such as may be used for a "hybrid" or electric vehicle. Battery system 90 powers loads of an electrical system 218 of vehicle 20 (e.g. starting, lighting, ignition, braking, steering, engine, etc.) according to a preferred embodiment (see FIG. 7). A wire harness or connector interconnects the batteries according to an alternative embodiment.

Figure 3:
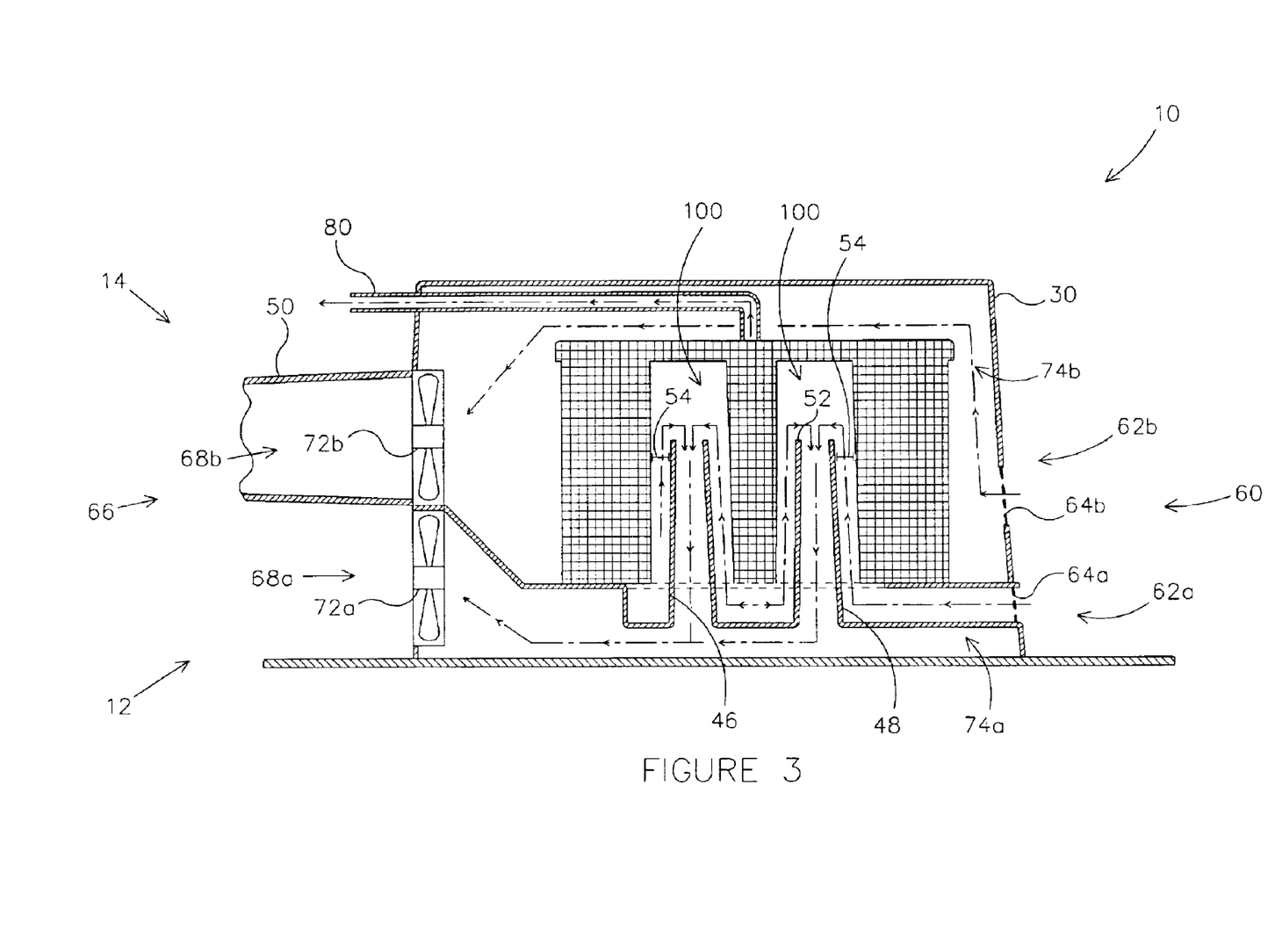
FIG. 3 is a sectional view of a heat and gas exchange system according to an alternative embodiment.
Figure 4:
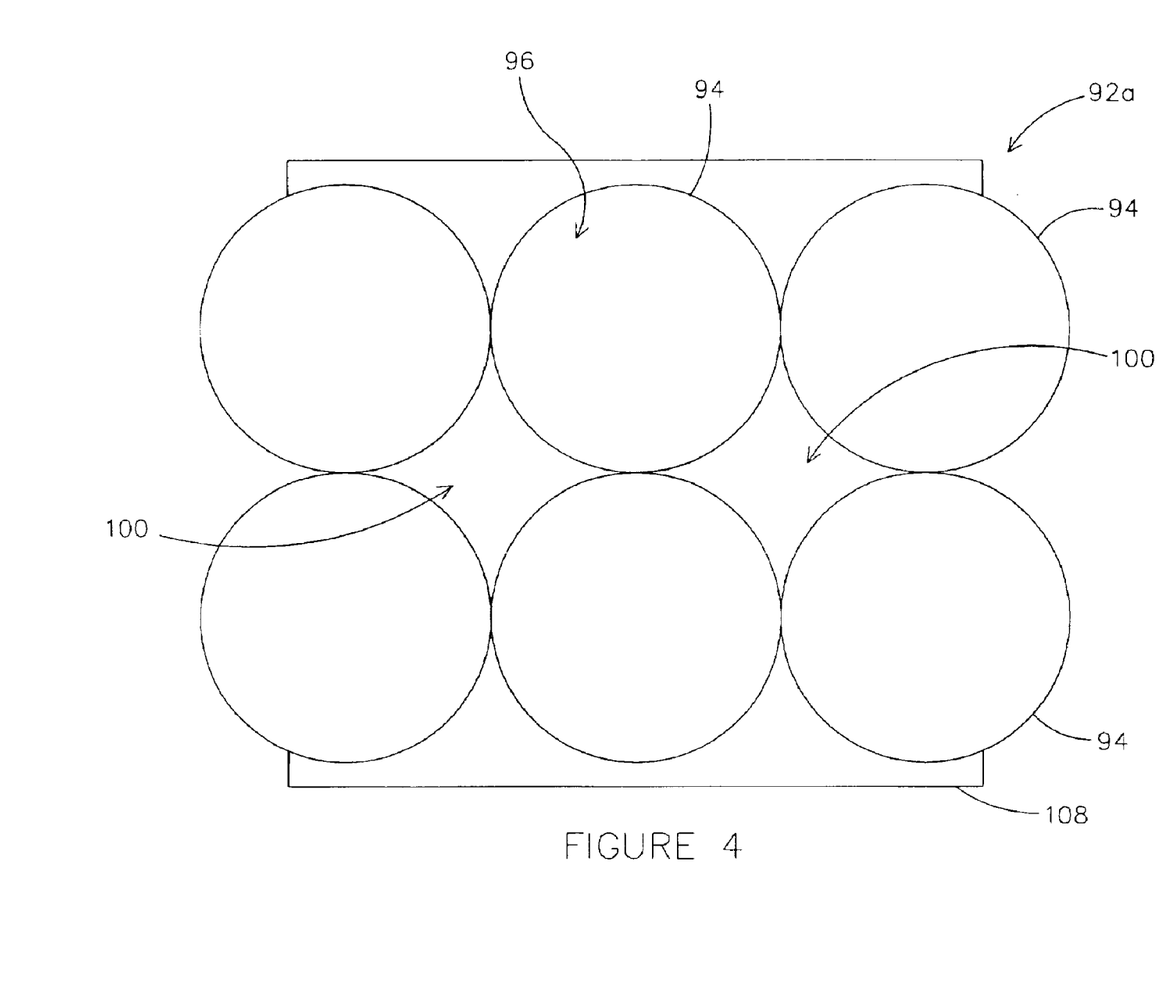
FIG. 4 is a bottom plan view of a battery for use with the heat and gas exchange system of FIG. 1 according to a preferred embodiment.

The battery system may include a single battery (e.g. 12V, 24V, 36 V battery, etc.) according to an alternative embodiment as shown in FIG. 3. The battery system includes a sealed valve regulated lead-acid (VRLA) battery according to a preferred embodiment. The battery is a 12V Optima Yellow Top absorbive glass mat (AGM) battery commercially available from Optima Batteries, Inc. of Boulder, Colo. according to a particularly preferred embodiment. A suitable battery includes a 2.4 amp hour Inspira 36V battery commercially available from Johnson Controls Battery Group, Inc. of Milwaukee, Wis.

Figure 2:
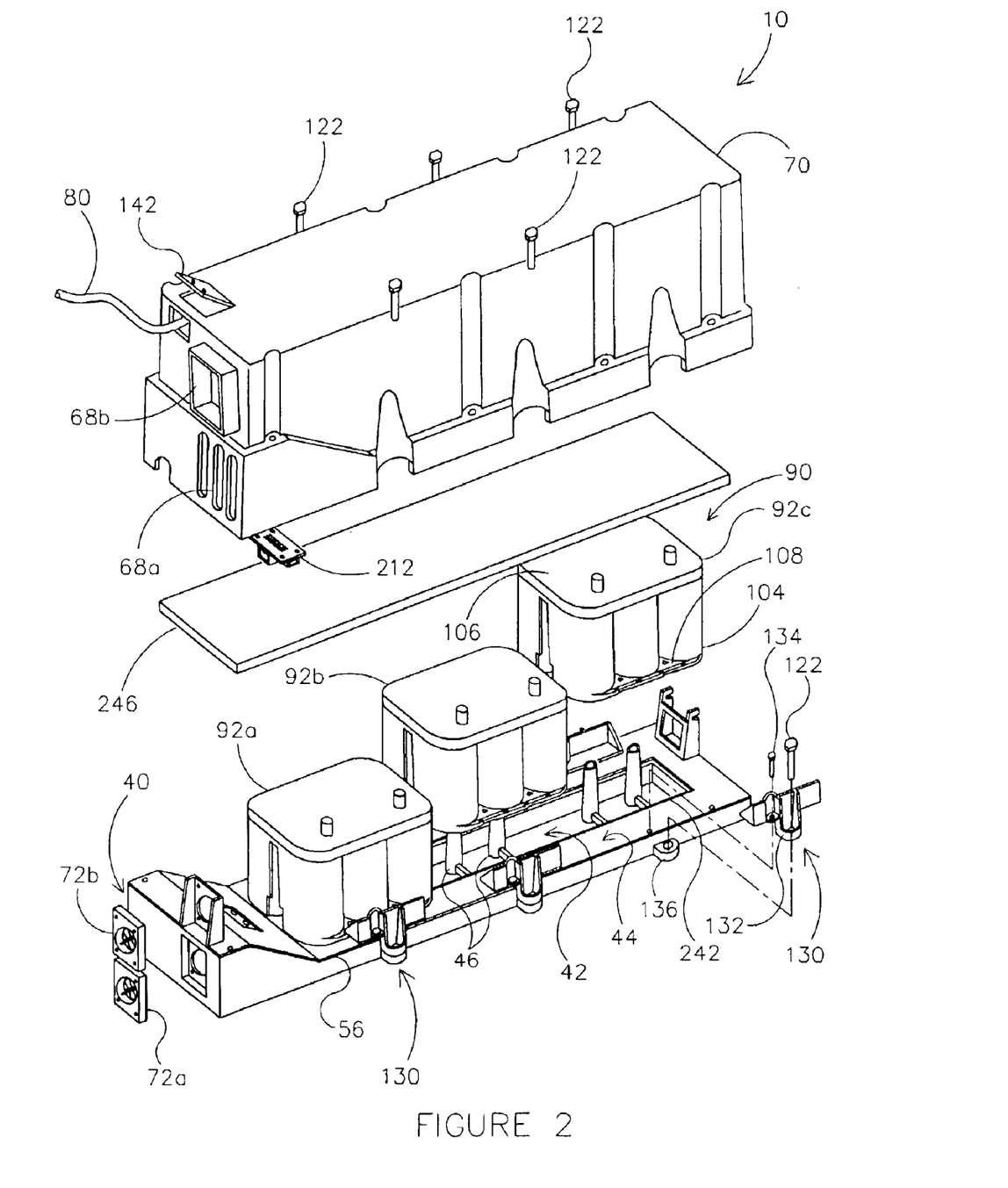
FIG. 2 is an exploded perspective view of the heat and gas exchange system of FIG. 1.

Referring to FIG. 2, batteries 92a, 92b and 92c each have six cylindrical cells 94. An open intercell core or interior channel 100 is provided in an interior core 96 among the cells. Channel 100 extends from a base 104 of battery 92a and terminates at a cover 106 of battery 92. The channel may extend through the base and the cover according to an alternative embodiment.

Battery system 90 is attached to base 40 of container 30 by a fastener (shown as a holddown 130 in FIG. 2). Holddown 130 reduces vibration or movement of battery 92a relative to base 40. Holddown 130 includes a bracket 132 attached to a flange 108 of base 104 of battery 92a. Holddown 130 is also attached to base 40 of container 30 by a fastener (shown as a screw 134). Bracket 132 abuts against a mounting interface of container 30 (shown as a flange 136). A fastener attaches bracket 132 to flange 136 and also attaches flange 136 to vehicle 20 (e.g. a mounting bracket in the vehicle passenger compartment).

A manifold 42 having members or fingers (shown as a hollow elongate cylindrical riser tube 46 in FIG. 2) extend from a body or plenum 44 of base 40. Each tube 46 is inserted into or adjacent one of channels 100 as battery 92a is supported on base 40. Tube 46 extends a substantial distance into core 96 of battery 92a between base 104 and cover 106 of battery 92a as shown in FIG. 3 according to a preferred embodiment. A lower air inlet 48 of tube 46 has a greater diameter than an upper air outlet 52 of tube 46 according to a preferred embodiment as shown in FIG. 2. A maximum diameter of tube 46 is less than a minimum diameter of channel 100 of battery 92a to facilitate insertion of tube 46 into channel 100. A gap 54 for the flow of air across the surface of core 96 is provided between tube 46 and an interior wall 98 of channel 100. Tube 46 is rigid according to a preferred embodiment as shown in FIG. 2, and may be flexible according to an alternative embodiment.

Base 40 is attached to cover 70 by a screw 122. A generally hermetic or airtight seal (shown as a partition wall or barrier 56) is provided between base 40 and battery 90. An access panel 142 attached to cover 70 provides relatively quick and easy access to battery system 90 (and/or components of heat exchange system 12) according to a preferred embodiment as shown in FIG. 2.

A dual-circuit air stream is provided in container 30 (shown as an interior air flow stream 74a and an exterior air flow stream 74b relative to battery 92a in FIG. 3). The air stream provides for thermal management of the battery system and the venting of gasses of the battery system. The air stream also maximizes the heat transfer surface area of the battery system and with minimal volume of the container.

Air from the environment (e.g. passenger compartment) is drawn through an air intake 60 of container 30 by rotation of a fan 72a and a fan 72b. A valve or baffle 64a and 64b of an inlet 62a and an inlet 62b provides for "one-way" or unidirectional routing of the air into container 30. An air outlet or exhaust 66 is provided opposite intake 60. Generally equal amounts of air are drawn through an outlet 68a and an outlet 68b of exhaust 66 according to a preferred embodiment. A greater amount of air may be drawn through either of the air flow streams by increased rotation of the fans (e.g. for greater gas or thermal management in the container) according to alternative embodiments. The fans may push or blow the air through the container according to an alternative embodiment.

Referring to FIG. 3, fan 72a draws air though inlet 62a into air flow stream 74a. Air flow stream 74a generally follows channels 100 of battery 92a, which provide a relatively large heat transfer surface area. Air in channels 100 (including warm air that may rise by convection to the top of channel 100) is drawn upward along an exterior of tube 46. Such air is then drawn out of channel 100 though the interior of tube 46 and into plenum 44 of manifold 42. Next, such excess air is drawn though plenum 44 and out of container 30 through outlet 68a, and re-circulated or vented to passenger compartment 22 (which may heat or cool the interior of vehicle 20) according to a preferred embodiment. Such air may also be vented to the exterior of the vehicle according to an alternative embodiment.

Referring further to FIG. 3, fan 72b draws air through inlet 62b into air flow stream 74b. Air flow stream 74b generally follows the exterior surface of battery 92a (e.g. top and side walls). Air flow stream 74b collects any gas that may be provided by battery system 90 (e.g. from potential failure of tube 80 or cover or case of the battery), and is vented to the exterior of the vehicle through outlet 68b. (The exterior air flow stream may be re-circulated or vented to the interior of the vehicle according to an alternative embodiment.) Barrier 56 (which includes a seal 242 around the periphery of battery system 90) separates air flow stream 74a from air flow stream 74b such that air flow stream 74b is not vented to passenger compartment 22 of vehicle 20 according to a preferred embodiment as shown in FIG. 2.

Referring further to FIG. 3, tube 80 connected to battery 92a provides a channel to vent gas generated by battery 92a to an exterior 26 of vehicle 20. Vent tubes from each of the batteries may be connected (e.g. with a T-junction tube) to form a single vent tube which vents air to the exterior of the vehicle according to an alternative embodiment.

Figure 5:
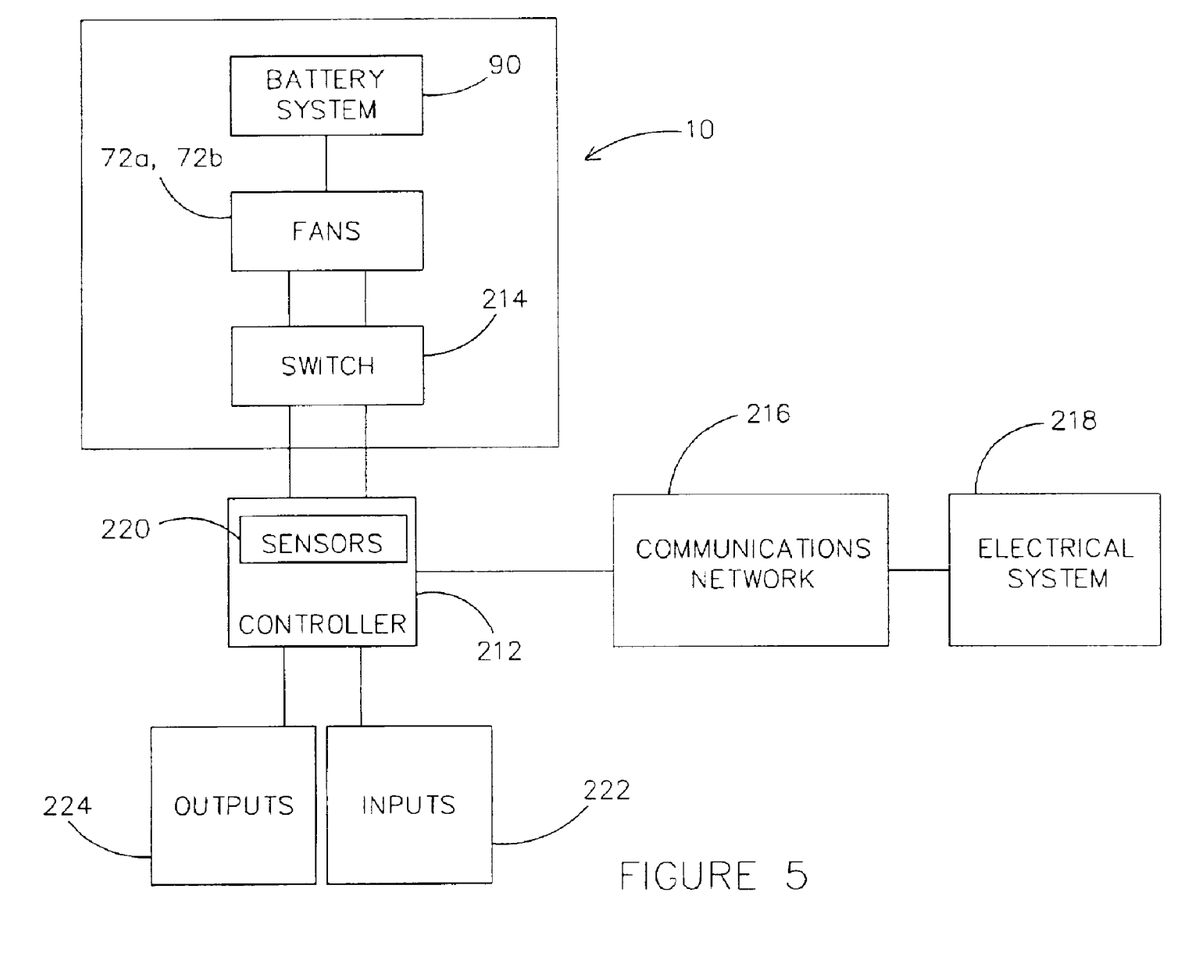
FIG. 5 is a system block diagram of a control system for the heat and gas exchange system of FIG. 1 according to an exemplary embodiment.

Referring to FIG. 5, a control system 210 for regulating heat exchange system 12 and gas exchange system 14 is shown according to an exemplary embodiment. The Control system may be provided inside or outside of the container. Control system 210 includes a controller for running a control program (e.g. implemented by software). The control program is stored in memory or in hardware. The control program runs routines (e.g. calculations, software, programs, algorithms, logic, etc.) using inputs 222 to provide outputs 224.

Figure 6:
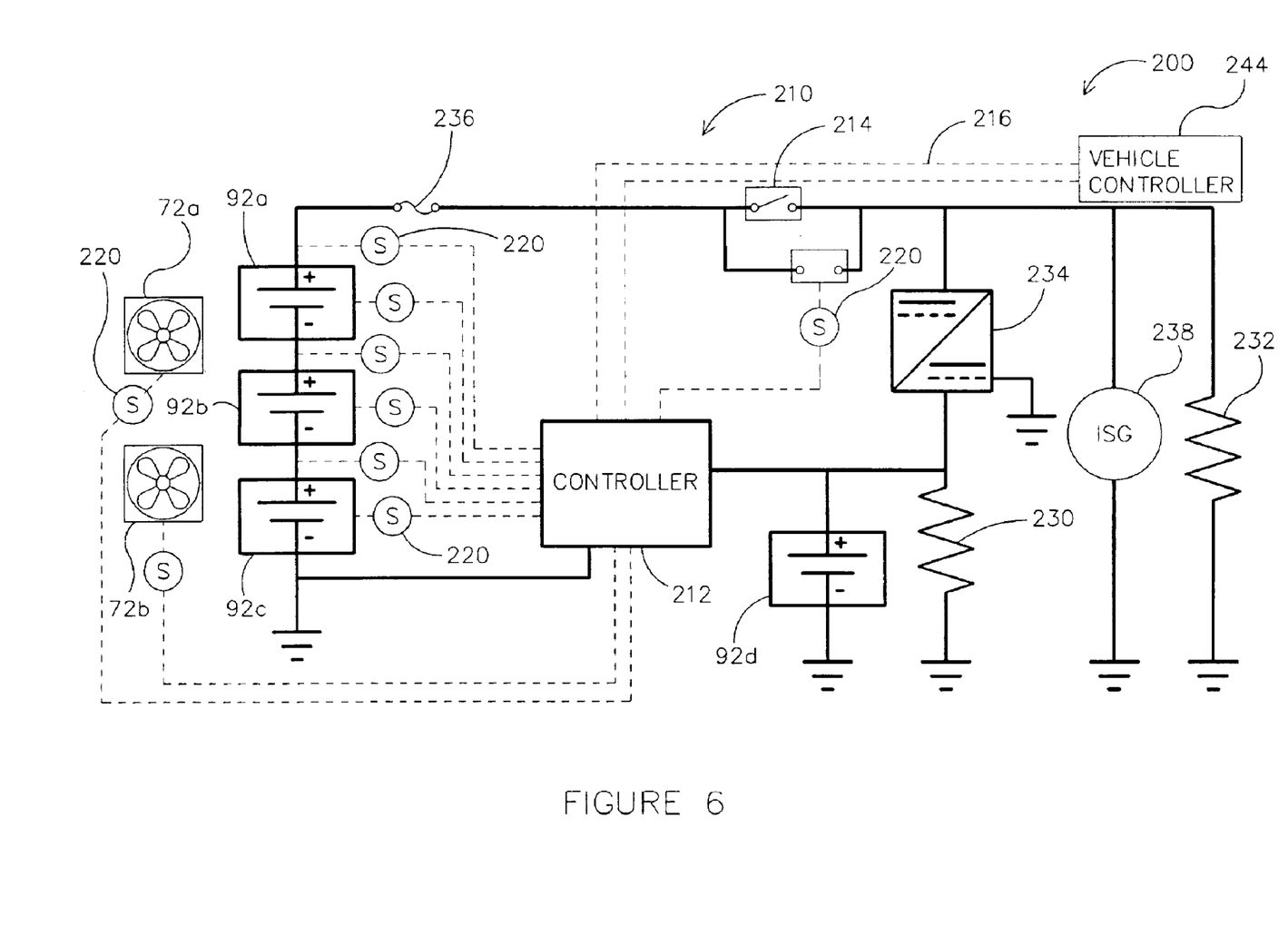
FIG. 6 is an electrical block diagram of a vehicle system according to a preferred embodiment.

Sensors 220 monitor conditions of heat exchange system 12 (e.g. battery state of charge, voltage, temperature, etc.), gas exchange system 14 (e.g. fan blade speed, number of fan rotations, etc.), and/or electrical system 218 (see FIG. 6). Sensors provide inputs 222 or signals to a controller 212 (i.e. signals representative of a condition of the battery or vehicle electrical system). One sensor includes a temperature sensor for monitoring the temperature of battery system 90 or the temperature within container 30. If the temperature is above a predetermined value, controller 212 directs a device or switch 214 to drive fans 72a and 72b (e.g. increase or decrease the speed of rotation of the blades of the fan) to cool battery system 90 with air from air flow stream 74a and/or air flow stream 74b. If the temperature is below a predetermined value, then controller 212 directs fans 72a and 72b to provide warmed air (e.g. provided by a heater) to battery system 90.

Other inputs 222 may be provided to controller 212 directly from electrical system 218 or via a vehicle communications network 216 connected to a vehicle controller 244. Based on inputs 222, controller 212 can, for example, determine which loads are connected and disconnected from battery system 90 and provide appropriate outputs 224 (e.g. in the event of the determination of certain conditions such as low SOC, over temperature condition, fan failure, temperature sensor failure, battery failure or imminent failure, battery replacement, etc.). Communications network 216 includes an appropriate interface (e.g., CAN, J1850, Lin, etc.) between electrical system 218 and controller 212, and includes a vehicle communication bus for communication of information to and from the vehicle systems.

The control system may be a microprocessor, controller or programmable logic chip (PLC) for implementing a control program and which provides output signals based on input signals provided by a sensor or that are otherwise acquired. According to alternative embodiments, any suitable controllers of any type may be included in the control system. For example, controllers of a type that may include a microprocessor, microcomputer or programmable digital processor, with associated software, operating systems and/or any other associated programs to implement the control program may be employed. According to alternative embodiments, the controller and its associated control program may be implemented in hardware, software or a combination thereof, or in a central program implemented in any of a variety of forms. According to an alternative embodiment, a single control system may regulate the controller for the control system and the controller (e.g. electrical control unit) for the vehicle.

Referring to FIG. 6, a vehicle system 200 is shown according to an exemplary embodiment. Vehicle system 200 includes battery system 90 having batteries 92a, 92b and 92c (e.g. three 12V batteries) to power high voltage loads (e.g. 42V loads) 232 of electrical system 218. Vehicle system 200 also includes a low voltage battery 92d (e.g. 12V battery) to power low voltage loads 230 (e.g. 14V loads) of electrical system 218.

The loads of electrical system 218 include any vehicle system that is powered by battery system 90 and/or battery 92d. Examples of high voltage loads include the starter, ignition, fuel pump, alternator, generator, an integrated starter generator 238 steering systems, braking systems, etc. Examples of low voltage loads include lighting systems, heating and cooling systems, air conditioning systems controls systems, accessories such as radio, windshield washing systems, cigarette lighter, etc. Power to and from battery system 90 and battery 92d may be shared (e.g. increased or decreased) via a power converter 234 (e.g. 42V/14V DC/DC converter). Power for controller 212 and rotation of fans 72a and 72b is provided by battery system 90 or battery 92d according to a preferred embodiment.

Battery system 90 is disconnected from high voltage loads 232 by actuation of switch 214 upon direction by controller 212 or by activation of a fuse 236 (e.g. in the event of a short circuit condition, relatively high or over-current condition, excessive temperature, excessive power drain on the battery system, etc.). The switch is a "solid state" switch such as a MOSFET according to a preferred embodiment. The switch may be a mechanical switch such as a relay according to an alternative embodiment. The switch may include a manual switch that is manually activated by a user to disconnect and reconnect the vehicle electrical systems from the battery system according to another alternative embodiment.

According to a particularly preferred embodiment, the container has a volume of about 380×330×830 mm (about 104 liters), and a volume of about 205×245×830 mm (about 41.7 liters) according to an alternative embodiment. The battery system occupies less than about 64 percent of the total volume of the container according to any preferred or alternative embodiment. The heat and gas exchange system may include at least about 95 percent material (by weight) that can be recycled according to any preferred or alternative embodiment. Such recyclable materials include a metal and plastic (e.g. polypropylene).

According to an alternative embodiment, the heat and gas exchange system may has a loudness level of less than about 4 sones (i.e. a unit of loudness equal to the loudness of a pure tone having a frequency of 1,000 hertz at 40 decibels), and includes "sound deadening" materials such as an acoustic mat 246 according to any preferred or alternative embodiment. According to other alternative embodiments, the container is provided with "fins" or flanges to increase surface area and promote heating and or cooling of the battery system. The walls of the container may provide a thermal barrier or insulation to promote heating and cooling of the battery system according to other alternative embodiments.

It is important to note that the construction and arrangement of the elements of the heat and gas exchange system as shown in the preferred and other exemplary embodiments is illustrative only. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. For example, elements shown as multiple parts or elements may be integrally formed (e.g. mounting interfaces may be attached to the base), the position of elements may be reversed or otherwise varied, and the nature or number of discrete elements or positions may be altered or varied. The heat and gas exchange system may be constructed from any of a wide variety of materials that provide sufficient strength or durability, including any of a wide variety of moldable plastic materials (such as high-impact plastic) in any of a wide variety of colors, textures and combinations. The container may be sized and shaped to complement the size and shape of a particular battery system according to alternative embodiments. The container may include a number of compartments that may be configured in various orientations (e.g. horizontal, vertical, rotated, etc.) and positions (e.g. with respect to the passenger compartment or other vehicle systems and components) and/or configured (e.g. shaped and sized) to fit in one or multiple vehicles or areas of vehicles of different types according to alternative embodiments. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the present invention as expressed in the appended claims.

What is claimed is:

1. A heat and gas exchange system for a battery for a vehicle, the battery having a plurality of cells and at least one space between the cells comprising:
   a base configured to support the battery; and
   a plurality of members coupled to the base;
   wherein each of the members is configured to extend at least partially within at least one space between the cells of the battery; and
   wherein the heat and gas exchange system is configured to draw air into the at least one space along an exterior surface of a first member of the plurality of members and to remove the air from the at least one space through an interior of the first member.

2. The system of claim 1 wherein the members are hollow.

3. The system of claim 2 wherein the members are elongate tubes.

4. The system of claim 1 wherein the members are configured to provide air from the space between the cells of the battery along a first air flow path.

5. The system of claim 4 further comprising a fan configured to provide the air through members.

6. The system of claim 4 wherein the members are vertical members.

7. The system of claim 4 further comprising a cover coupled to the base and providing a second air flow path across an exterior surface of the battery.

8. The system of claim 7 further comprising an outlet configured to vent air of the first air flow path to an interior of the vehicle.

9. The system of claim 7 further comprising an outlet configured to vent air of the second air flow path to an exterior of the vehicle.

10. A heat and gas exchange system for a battery for a vehicle, the battery having a plurality of cells and a plurality of spaces between the cells comprising:
    a housing comprising:
    a base configured to support the battery;
    a cover coupled to the base;
    first means for venting air from the spaces between the cells of the battery;
    second means for venting air across an exterior surface of the battery;
    wherein the first means for venting and the second means for venting both at least partially regulate the temperature within the housing.

11. The system of claim 10 wherein the first means for venting comprises a plurality of hollow members coupled to the base.

12. The system of claim 11 further comprising a fan configured to provide air through the members from the space between the cells of the battery along a first air flow path.

13. The system of claim 12 wherein the second means for venting comprises a fan configured to provide air along a second air flow path access on exterior surface of the battery.

14. The system of claim 13 further comprising an partition configured to inhibit the communication of air between the first air flow path and a second air flow path.

15. A module for a battery for a vehicle, the battery having a plurality of cells and at least one space between the cells comprising:
    a base for supporting the battery;
    a plurality of members coupled to the base;
    a control system configured to provide air through the plurality of members from the space between the cells such that air introduced into the space along an exterior surface of the plurality of members is removed from between the cells through an interior of the members.

16. The module of claim 15 wherein each of the members are configured to extend at least partially within at least one space between the cells of the battery.

17. The module of claim 16 further comprising a cover coupled to the base and defining a first air flow path along the space between the cells and a second air flow path along an exterior surface of the battery.

18. The module of claim 17 wherein the control system further comprises at least one fan configured to provide the air along at least one of the first air flow path and the second air flow path.

19. The module of claim 18 wherein the control system further comprises a sensor configured to monitor the temperature of the battery.

20. The module of claim 19 wherein the control system is configured to activate the fan when the temperature of the battery is above a predetermined value.

* * * * *